Nov. 17, 1931.  N. E. STEPHENS  1,832,750
COLOR CHART
Filed May 13, 1927   2 Sheets-Sheet 1
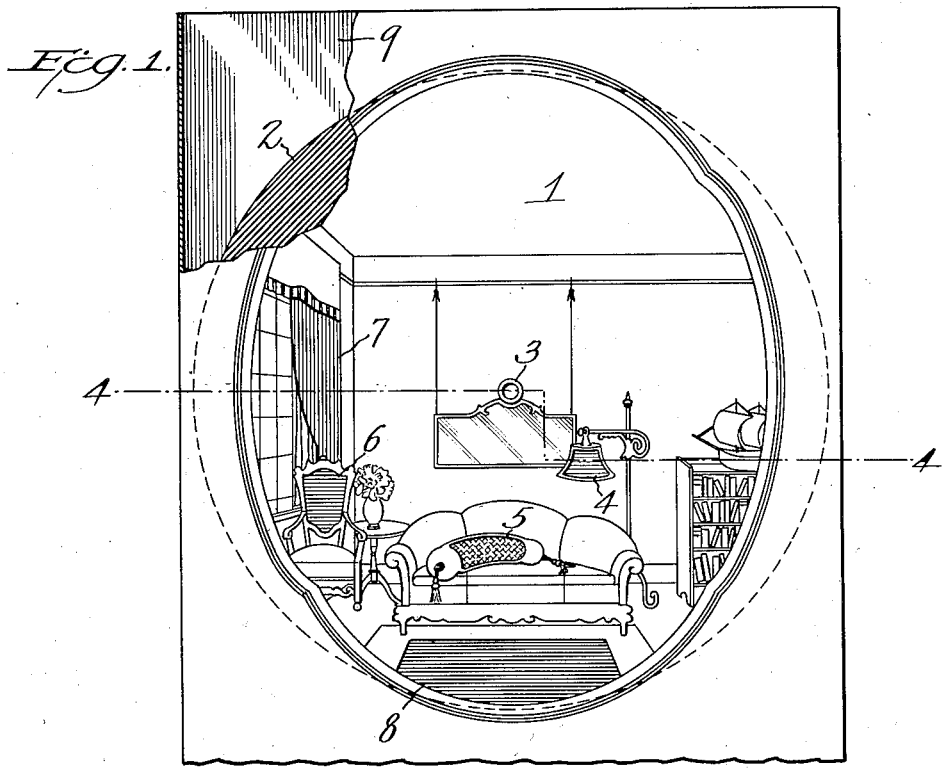
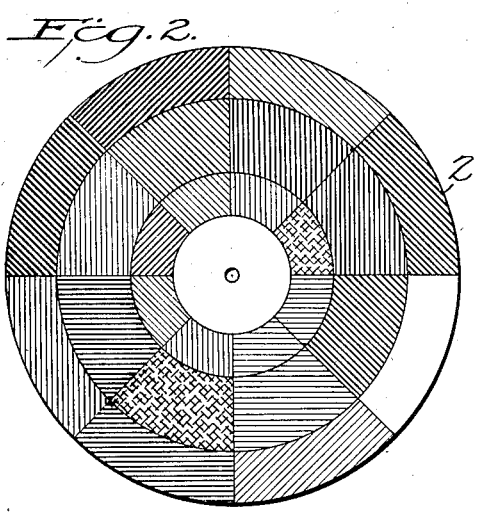
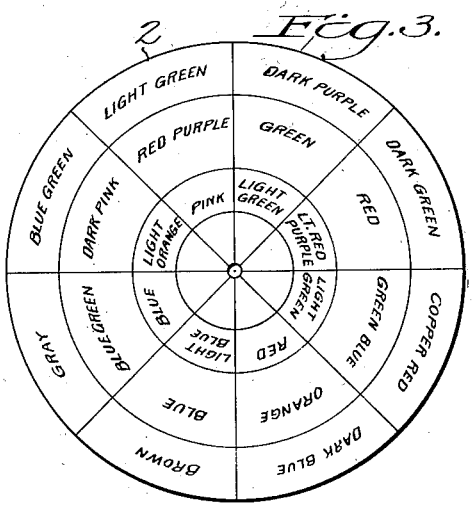
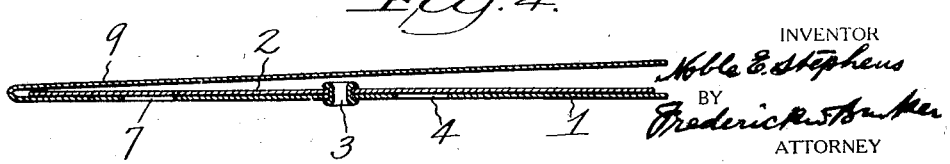
INVENTOR
Noble E. Stephens
BY
Frederick W. Barker
ATTORNEY Nov. 17, 1931. N. E. STEPHENS 1,832,750
COLOR CHART
Filed May 13, 1927 2 Sheets-Sheet 2
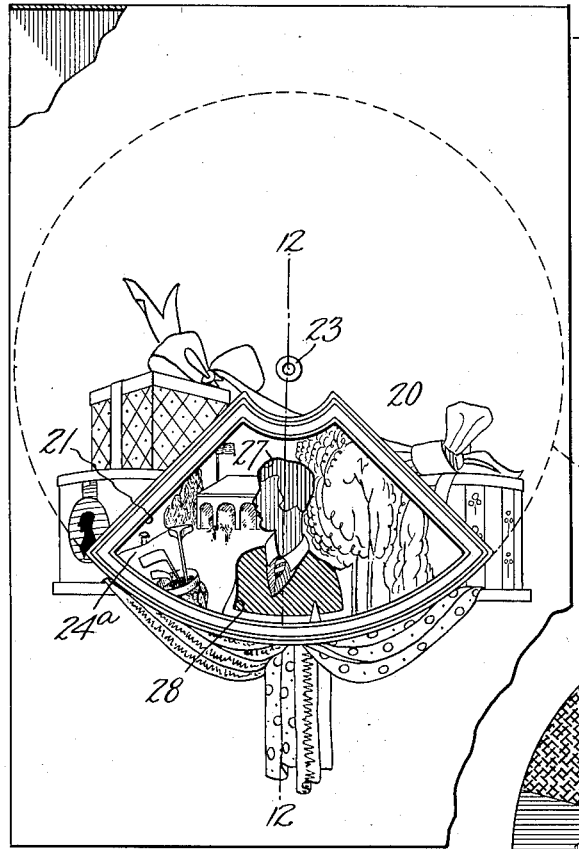
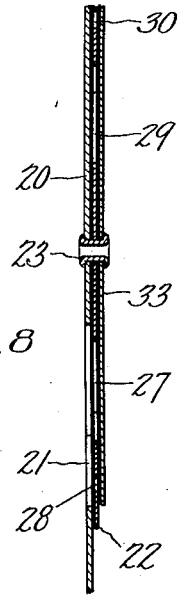
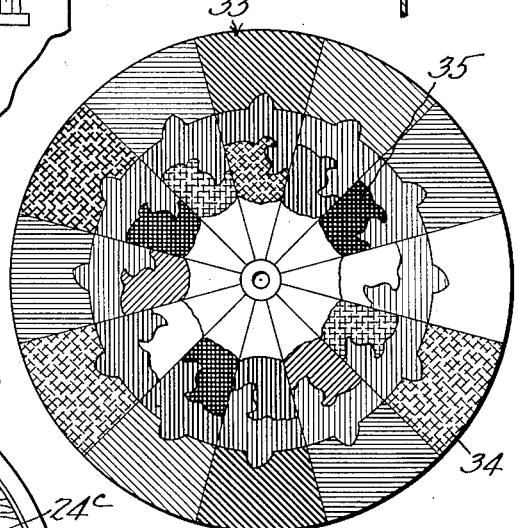
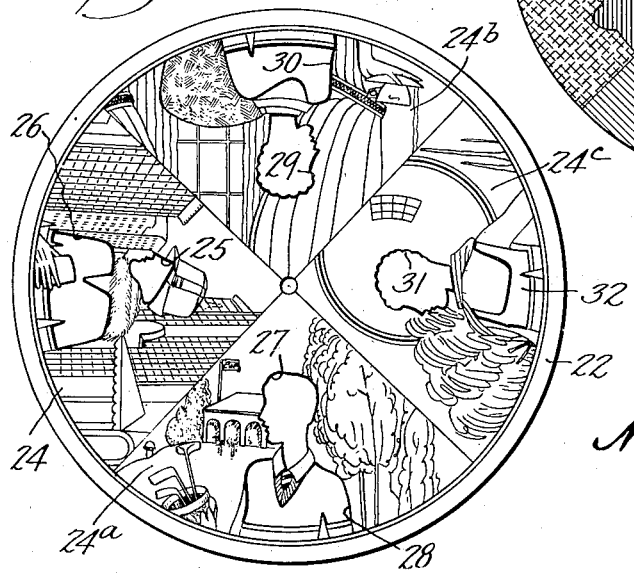
INVENTOR.
Noble E. Stephens
BY Frederick W. Barker
ATTORNEY Patented Nov. 17, 1931

1,832,750

UNITED STATES PATENT OFFICE

NOBLE E. STEPHENS, OF NEW YORK, N. Y.

COLOR CHART

Application filed May 13, 1927. Serial No. 191,030.

While those skilled in the art of producing suitable color effects upon various subjects are enabled from their knowledge of color harmony to arrange different colors, shades and tints with due regard to relative proportions, spacings and tones of the colors employed, it has always been found difficult to guide others, not possessed of the necessary training, in observing the simple laws which govern color selection, proportioning and conjunction. In consequence it is common to note in decorative schemes, such for example as building interiors and exteriors, wearing apparel, and all the various instances where individual choice has governed, so many examples where the colors clash, where inappropriate shades and tints are employed, where the areas occupied by different colors are incorrectly proportioned, and where the relative spacings between different colored areas fail to realize in the whole color scheme that pleasing harmony which is the proof of skillful arrangement.

Color charts are well known in the patented art and have been devised in different forms to teach the use of complementary colors, their shades and tints, but these charts fail to show how the user in any particular instance should proportion and space respective color areas to create a properly balanced and harmonized or effective decorative scheme, these essential details being left to individual initiative and resulting too often in unbalanced and incongruous color combinations.

Therefore the purpose of my invention is to provide color charts in the form of pictorial representations exemplifying particular subjects whose individual features have applied thereto suitable complementary or harmonizing colors, shades or tints, and wherein the color areas are proportioned and distanced appropriately to achieve a properly balanced effect. These charts are provided with shiftable parts bearing different color groupings all in the same relation and adapted to synchronize in the same pictorial representation, so that a variety of different color effects, all equally balanced, may be exhibited on a single chart.

Other features and advantages of my invention will hereinafter appear.

In the drawings:

Figure 1 is a face view of my improved color chart, which is in the form of a folder, said face view showing the front sheet on which is depicted a fixed scene representing the interior of a living room, with cut-out portions of different areas to display the colored portions of a rear, shiftable member, said front sheet also being broken away to expose said shiftable member and the back sheet of the folder.

Fig. 2 is a front view of the shiftable member, on a reduced scale, bearing different color groupings for display respectively through the cut-out portions of the front sheet.

Fig. 3 is a rear view of the shiftable member bearing in like relation the names of the colors in the groupings on the front view.

Fig. 4 is a section on the line 4—4 of Figure 1 showing the pivotal connection between the shiftable member and front sheet.

Fig. 5 is a face view of my improved color chart showing the front sheet thereof having a cut-out portion.

Fig. 6 is a face view of a disk which is pivoted at the back of the front sheet and bears different pictorial representations with a cut-out portion representing a figure.

Fig. 7 is a face view of a disk bearing different color groupings for display respectively through the cut-out portions of the other disk and the front sheet.

Fig. 8 is a section on the line 12—12 of Fig. 5, showing the pivotal connection between the disk and front sheet.

In the example of my invention illustrated in Figures 1 to 4 let 1 indicate the front sheet of a folder bearing on its face an imprint representing the interior of a furnished dwelling room, with cut-out portions of different shapes, and areas in appropriate positions for exposure therethrough of the colored portions of room furnishings. Back of sheet 1 is a disk 2 that is pivoted to sheet 1 as by an eyelet 3. The disk 2 bears on its face three concentric color bands, each divided into eight differently colored segments, the color arrangement of the twenty-four segments being arbitrarily devised to permit, in the example, the exposure at one time of five different colors in a group through the cut-out portions of the front sheet, and enabling the display separately of eight different color groupings in the rotation of the disk through a complete revolution.

For example the innermost color band is divided into eight segments, which respectively present on the disk surface the colors light green, light red purple, light green, red, light blue, blue, light orange, pink, while the back of the disk bears the printed names of those colors in positions corresponding to the respective colored segments, to thereby designate said colors. Similarly the middle color band is divided into eight segments which respectively present on the disk surface the colors green, red, green blue, orange, blue, blue green, dark pink, red purple, the back of the disk bearing the printed names of those colors in positions corresponding to its respective colored segments; and similarly the outer color band is divided into eight segments which respectively present on the disk surface the colors dark purple, dark green, copper red, dark blue, brown, gray, blue green, light green, the names of these colors also being printed on the back of the disk in positions corresponding to its respective colored segments.

This arrangement provides eight groups of three colors, each group being in radial formation. The interior scene represented on the front sheet or overlay 1 has the cut-out portions 4, 5, 6, 7 and 8, the portion 4 defining a lamp shade and being positioned to expose a color from the inner color band, the portions 5, 6 and 7 respectively defining a cushion on the sofa, a chair back and a curtain, and being positioned to expose colors from the middle color band, and the portion 8 defining a rug and being positioned to expose a color from the outer color band. With the arbitrary positioning of the cut-out portions 4, 5, 6, 7 and 8, their respective areas and spaced relationship, it is necessary that the five different colors to be exposed therethrough at any one time shall either harmonize or present a pleasing artistic contrasting effect. In consequence the twenty-four segments on the disk surface are so arranged that eight different color groups are provided, each group consisting of five different colors adapted by reason of their arrangement upon the disk 2 for exposure at one time through the cut-out portions 4, 5, 6, 7 and 8, the said eight color groups being capable of exposure successively by rotation of the disk 2.

The back sheet 9 of the folder is intended to serve as a cover for the disk 2, to protect the latter.

It will be understood that color artistry must be employed in effecting a suitable arrangement of the different colors in the sections upon the disk 2, also the placement and relative areas of the cut-out portions of sheet 1, so that the color groups will be caused to appear appropriately with respect to the pictured scene they embellish; so that the cut-out areas may expose a color whose relation to the other colors of the group is thereby correctly proportioned; and so that the spacing apart of the respective color exposures in the group will picturize the color areas in properly balanced relation. With each of the eight different color groups represented by color segments whose arrangement upon the disk surface permits the exposure through the cut-outs of one color group at a time, then it is obvious that all of the other color groups may be similarly displayed in the same arrangement by the act of turning the disk to bring said other groups successively into view through said cut-outs.

In Figs. 5, 6, 7 and 8 is illustrated another application of my invention wherein appropriate, harmonized colors are caused to appear as representative of wearing apparel upon a figure shown in scenes suited to different conditions of indoor and outdoor wear.

In the present example the drawings show a front sheet 20 having segmental cut-out 21, a disk 22 pivoted at 23 to sheet 20 and disposed at the back thereof, the disk 22 bearing disposed thereon in radial arrangement these several scenes, viz: a street scene 24 with cut-out 25 delineating a face and cut-out 26 delineating a figure portion; an outdoor sport scene 24a with cut-out 27 delineating a head and face and cut-out 28 delineating a figure portion; a day indoor scene 24b with cut-out 29 delineating a head and face and cut-out 30 delineating a figure portion, and a night indoor scene 24c with cut-out 31 delineating a head and face and cut-out 32 delineating a figure portion. By rotation of disk 22 the different scenes can be brought into registry with cut-out 21 for exposure therethrough. Back of disk 22, and also pivoted at 23, is a disk 33 provided on its front surface with an outer, circular color band 34 divided into a number of equal segments. In the example twelve different colored segments are shown, the colors being identified by their names appearing on the back of the disk behind the respective color segments to designate the colors. Also the disk 33 bears upon its surface, in radial disposition with the color segments respectively, different flesh and hair colorings, included in segments of an inner color band, 35, with which the colors of the outer segments harmonize.

Generally the idea underlying the creation of this embodiment of my invention is to enable a person having a certain color of complexion and certain colored hair, to pictorially represent the dominant color of clothing that can most appropriately be worn in conjunction with a particular combination of hair and complexion coloring. Thus, upon turning the disk 33 to bring for example the cut-out 25 in registry with any one of the segments 35, thereby the dominant apparel coloring, in harmony with the coloring of the exposed face and hair, is caused to appear through whichever one of the scenes 24, 24a, 24b or 24c has been brought into registry with the cut-out 21.

It will be noted that the coloring in the radial segments of band 35 is in each instance designed to represent the hair upon a person's head, with a flesh tint for the face and neck, and so that the face, head and neck become silhouetted when a segment of disk 35 registers with any pair of the radial cut-outs 25, 26; 27, 28; 29, 30, or 31, 32. In this manner there is presented to view a picture of a person whose clothing in its dominant color harmonizes with or is complementary to the hair and complexion coloring of that person, thereby enabling proper choice to be made of suitable clothing colors.

It is to be understood that the example illustrated in Figs. 5 to 8, wherein an intermediary revoluble disk is employed with different scenes for exposure through the cut-out in the cover, said intermediate disk itself having cut-outs for exposure of colors on the color disk, is equally applicable with other adaptations of my invention.

Variations within the spirit and scope of my invention are equally comprehended by the foregoing disclosure.

I claim:

1. A color display device comprising a front sheet bearing an impress pictorially representative of a subject having a group of features to be colored differently, said features being silhouetted by the edges of cut-outs from said sheet, and a disk pivoted at the back of said sheet said disk bearing groups of colored areas adapted for exposure successively through said cut-outs of the front sheet, each group of colored areas being balanced in spaced relationship and proportioned as to the exposed areas thereof to harmonize the group color effect.

2. A color display device comprising a front sheet bearing an impress pictorially representative of a scene having a group of features to be colored differently, said features being silhouetted by the edges of cut-outs from said sheet, and a disk pivoted at the back of said sheet, said disk bearing upon its face groups of colored, tinted or shaded areas adapted for exposure through said cut-outs of the front sheet, each group of colored, tinted or shaded areas being balanced in spaced relationship and proportioned as to the exposed areas thereof to harmonize the group color effect, and said groups being arranged upon the disk for successive exposure through the cut-outs of the front sheet by rotation of said disk.

3. A color display device comprising a front sheet bearing an impress pictorially representative of a scene and having a cut-out silhouetting an object to be exposed therethrough, a disk pivoted at the back of said sheet and bearing different pictorial representations of the object for exposure successively through the sheet cut-out, said disk having cut-outs through portions of its pictorial representations, and a second disk pivotally supported behind said first named disk, said second disk bearing on its face groups of colored areas adapted for exposure successively through the cut-out in the sheet and aligned cut-outs of the first named disk when a pictorial representation thereon registers with the cut-out in the sheet, said groups of colored areas respectively being balanced in spaced relationship and proportioned as to the exposed areas thereof to harmonize the group color effect.

4. A color harmony chart for exterior or interior decoration of houses, comprising a field of radially arranged colors and a mask covering said field, said mask having a plurality of openings of different sizes formed therein, said openings being so spaced as to expose colors of said field in harmonious combinations, the sizes of said openings being such that the areas of colors exposed at any one time by them are proportioned so as to present an approximate relationship such as the contemplated decoration will contain in practice.

5. A color harmony chart for exterior or interior decoration of homes comprising a field of radially arranged colors and a mask covering said field, said mask being rotatable with relation to the field and having openings formed therein, said openings being so spaced as to expose colors of said field in harmonious combinations, said openings also being varied in size so as to expose such areas of colors as will indicate the general color effect to be obtained by the application of colors exposed.

New York, May 11th, 1927.

NOBLE E. STEPHENS.